(12) United States Patent
Morrow

(10) Patent No.: US 7,721,006 B2
(45) Date of Patent: *May 18, 2010

(54) META-MESSAGE SET WITH REAL-TIME AND DATABASE ASPECTS

(75) Inventor: James Morrow, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/956,431

(22) Filed: Sep. 30, 2004

(65) Prior Publication Data

US 2005/0097247 A1    May 5, 2005

Related U.S. Application Data

(63) Continuation-in-part of application No. 09/746,854, filed on Dec. 22, 2000.

(60) Provisional application No. 60/174,192, filed on Dec. 30, 1999.

(51) Int. Cl.
*G06F 3/00* (2006.01)
*G06F 13/12* (2006.01)
*G06F 13/42* (2006.01)
*G06F 13/14* (2006.01)
*G06F 15/16* (2006.01)
*G06F 19/00* (2006.01)
*G06F 17/00* (2006.01)

(52) U.S. Cl. .................. 710/5; 710/8; 710/11; 710/63; 710/64; 710/71; 710/105; 710/305; 710/311; 710/313; 710/315; 709/217; 709/230; 700/95; 700/112; 700/119; 700/123; 700/230; 700/231; 700/266; 700/267

(58) Field of Classification Search ..................... 710/5, 710/8, 11, 63–64, 71, 105, 305, 311, 313, 710/315; 709/217, 230; 700/95, 112, 119, 700/123, 230, 231, 266, 267
See application file for complete search history.

(56) References Cited

U.S. PATENT DOCUMENTS 5,790,117 A * 8/1998 Halviatti et al. ............. 715/744

(Continued)

FOREIGN PATENT DOCUMENTS

EP          1078662        2/2001
WO     WO-03/030110      10/2003

*Primary Examiner*—Niketa I Patel
(74) *Attorney, Agent, or Firm*—Ivan Posey; Brooke Quist; David N. Caracappa

(57) ABSTRACT

A generic device controller unit system (10) includes a generic "true real time" peripheral device controller and a data and protocol communications interface that uses a common set of instructions from a meta-message set. The system (10) is generic, in that the system (10) is capable of connecting a processor (40) to any number of various peripheral devices (50), instead of being designed to interconnect a processor (40) only to a specific peripheral device (50). The system (10) interfaces between a standard non-true real time operating system and peripheral devices (50) in such a manner as to employ true real time peripheral device control using the meta-message set. The device controller of the system (10) allows a standard non-true real time operating system to send instructions from the meta-message set to implement true real time control of peripheral devices (50). The system (10) interfaces between a processor (40) and peripheral devices (50) such that the data and protocol communications interface of the system (10) allows the processor (40) to utilize a single protocol, associated data and set of instructions in order to communicate with peripheral devices (50) which are utilizing different protocols and associated data.

11 Claims, 6 Drawing Sheets

U.S. PATENT DOCUMENTS

| | | | |
|---|---|---|---|
| 5,958,020 A * | 9/1999 | Evoy et al. | 710/3 |
| 6,052,107 A * | 4/2000 | Montijo | 715/716 |
| 6,138,174 A * | 10/2000 | Keeley | 710/5 |
| 6,233,626 B1 * | 5/2001 | Swales et al. | 710/11 |
| 6,301,650 B1 | 10/2001 | Satou | |
| 6,439,999 B1 | 8/2002 | Matsuzawa | |
| 6,463,338 B1 * | 10/2002 | Neet | 700/17 |
| 6,675,226 B1 * | 1/2004 | Nair et al. | 709/250 |
| 2002/0065960 A1 * | 5/2002 | Swales et al. | 710/5 |
| 2007/0300232 A1 * | 12/2007 | Marriott et al. | 719/311 |

* cited by examiner

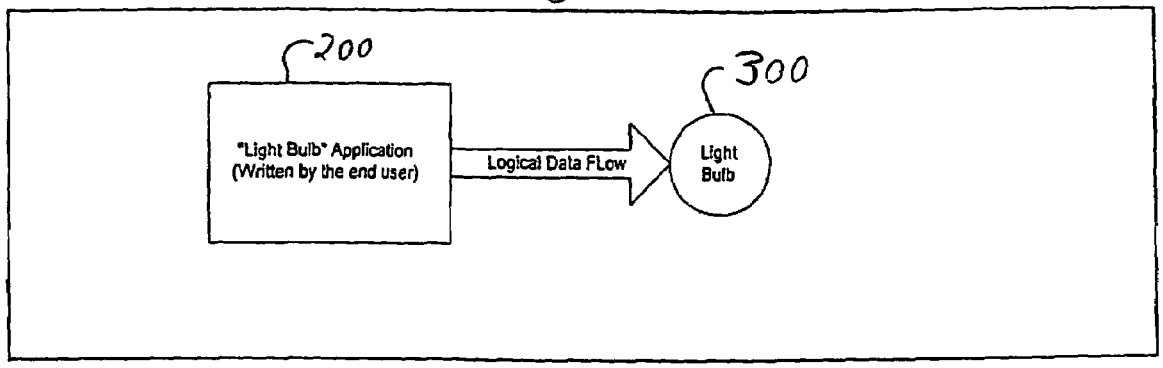
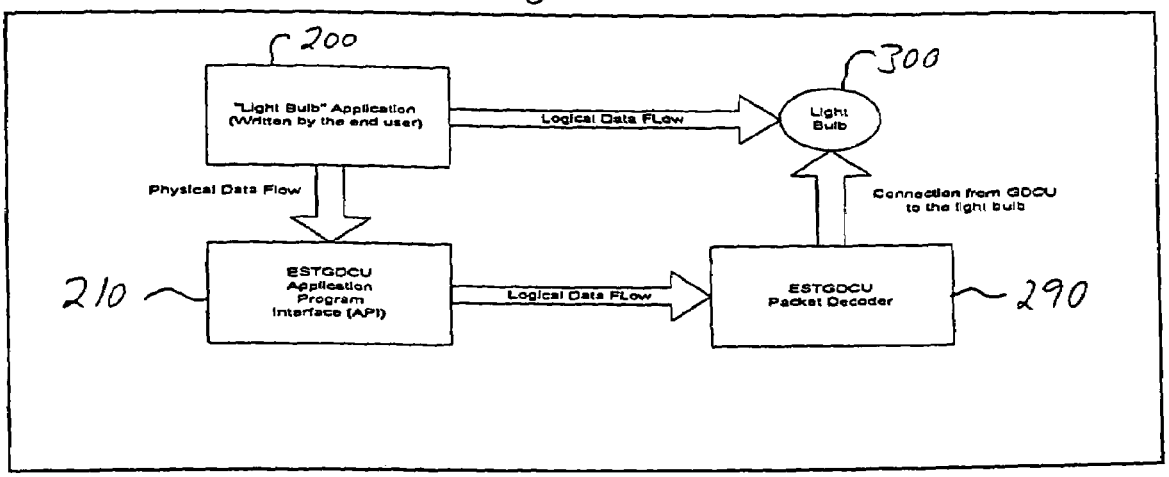

META-MESSAGE SET WITH REAL-TIME AND DATABASE ASPECTS

RELATED APPLICATION

This application is a continuation-in-part of U.S. Ser. No. 09/746,854 filed Dec. 22, 2000, which claims the benefit of U.S. Provisional Application No. 60/174,192, filed Dec. 30, 1999.

FIELD OF THE INVENTION

This invention relates generally to generic device controller unit systems and, more particularly, to a system and methodology for facilitating peripheral device control from a processor via a generic device controller unit system using a Meta-Message set of instructions.

BACKGROUND OF THE INVENTION

For some time now, there has been a growing need to be able to inexpensively and easily connect a number of arbitrary devices to a computer running a standard operating system such as Microsoft Windows. However, connecting devices to a computer running such a complicated operating system presents at least two vexing problems to the system designer.

The first problem involves the matter of physical interconnection, that is, some type of custom device is to be plugged into the computer. General-purpose "IBM-compatible" computers have become more and more powerful and less and less expensive with every passing month, but that market is driven by a handful of more or less universal needs, such as a printer, a monitor, a keyboard, a mouse, a modem, and a hard disk. The modem hardware platform is optimized for accommodating these elements.

Meanwhile, the addition of custom equipment generally has meant either building an expansion board designed to specifically interface to that equipment, or buying a general-purpose board that could be adapted to that purpose. The least expensive of these options is to add an expansion board by building or buying an industry-standard architecture (ISA) board. However, as time goes on, modem central processing unit (CPU) boards are being built with fewer and fewer ISA slots. Many central processing unit boards these days have only one ISA slot. This forces designers to have to develop much more complicated and expensive Peripheral Component Interface (PCI) boards. A PCI bus provides a high-bandwidth data channel between system board components, such as the CPU, and devices, such as hard disks and video adapters. Another problem experienced today is that most central processing unit boards have a limited number of corn ports. This creates a limitation in the number of devices that can be utilized.

The second problem facing the system designer that wants to incorporate custom hardware into a Windows environment is the issue of software development. Operating systems, by definition, are in charge of resource management. To that end, operating systems regard any and all hardware attached to the system as belonging to the operating system. As a result, user access to that hardware is supposed to be mediated by the operating system.

Windows NT, for example, being a secure operating system environment, rigorously enforces that rule. Accordingly, the result of user access to hardware being mediated by the NT operating system is that any effort by an application to access hardware directly is intercepted and disabled by the operating system. Hence, access to hardware can only be achieved through device drivers, which are assumed to be trustworthy because they are loaded into the operating system at boot time.

Moreover, device driver programming is one of the most difficult software development paradigms in existence. Programming mistakes tend to make the computer crash, often without any indication of what went wrong. Debugging tools are primitive and difficult to use, and are limited in the information they convey. Each compile load-test cycle requires that the target machine be shut down and rebooted, which can take several minutes. Thus, the debugging process is often slow and discouraging work. In addition, many designers avoid performing Windows driver development. As a result, it is desirable to remove the need for developers to have to perform such work.

Another major problem experienced when connecting a number of arbitrary devices to a computer running a standard operating system, again, such as Microsoft Windows, is the issue of real time device control. Essentially, true real time depends upon the application. A standard Windows environment, such as Windows 98 or Windows 2000, does not actually have true real time device control requirements for resource management by the operating system. The operating system simply performs the ordered functions as soon as it is able, which is usually in a sub-200 millisecond time frame. This time frame is small enough that most people equate this response time to be "real time," but in actuality it is not "true real time."

However, many peripheral devices actually have true real time device control requirements that are more precise than the above-stated time interval. For example, loaves of bread may be traveling down a conveyer belt at a given number of miles per hour. These loaves of bread have to be sprayed by a butter sprayer at precise time intervals as the loaves of bread pass the sprayer. If these true real time device control requirements are not maintained, the butter sprayer will miss the loaves of bread as they pass by the sprayer. Unfortunately, previous attempts to make the standard Windows operating systems function with true real time device control (such as with layered real time systems or real time kernels), have proved to be undesirably expensive, complicated, and inflexible, requiring more corn ports to be added. Further, these ports are slow (typically 9600 baud) and do not address the need to mix high-speed data (video) and low speed data (mouse clicks) communications.

Accordingly, those skilled in the art have recognized the need for a device controller that has overcome the previous difficulties associated with physical interconnections between hardware, software, and operating systems; software development issues; and true real time device control. The system and method of the present invention is designed to eliminate the problems of hardware interconnection, software interfacing, and true real time device control. The present invention clearly fulfills these and other needs.

SUMMARY OF THE INVENTION

Briefly, and in general terms, the present invention resolves the above and other problems by providing a generic device controller unit system for facilitating interconnection and control between a processor and one or more peripheral devices. More particularly, the generic device controller unit system includes a generic, true real time peripheral device controller and a data and protocol communications interface. The generic device controller employs true real time peripheral device control by interfacing between a non-true real time operating system and the peripheral devices. As such, the device controller allows a standard computer that employs a non-true real time operating system to implement true real time control of the peripheral devices. The data and protocol communications interface connects the processor to the peripheral devices which it controls via the generic device controller unit system, allowing the processor to utilize a single protocol and associated data to communicate with the peripheral devices which may be utilizing different protocols and associated data than that which is used by the processor, as well as differing communication speed and bandwidth needs. Also, the present invention allows for "interrupt," "bulk," and "isochronous" data transfers, thus, allowing various devices with differing data priorities to coexist.

In accordance with one aspect of the present invention, the generic device controller unit system produces true real time peripheral device control while interfaced with a non-true real time operating system that is running standard non-true real time (e.g., at time intervals of greater than 200 ms) software. Preferably, the generic device controller unit system provides true real time (e.g., at time intervals of less than 50 ms) peripheral device control while interfaced with a non-true real time operating system that functions in a Win32 environment. The generic device controller unit system provides the real time device control to the resource management capabilities of a standard non-true real time operating system.

In accordance with another aspect of the present invention, the generic device controller unit system produces true real time peripheral device control without the higher-level functionality of a processor. Preferably, the generic device controller unit system produces true real time peripheral device-control without a processor having a true real time kernel. Additionally, the generic device controller unit system also preferably produces true real time peripheral device control without a processor having a layered true real time operating system.

In accordance with still other aspects of the present invention, Universal Serial Bus (USB) is the preferred communication protocol between the generic device controller unit system and the processor. Preferably, the generic device controller unit system is an input/output device interface between a processor and the peripheral devices that are being controlled. The generic device controller unit system preferably also includes customized system drivers. Preferably, the generic device controller unit system functions as a distributed processing environment. In addition, the present invention allows for bandwidth sharing, data speed differences, and the invention accommodates for various levels of interrupt priority.

In another preferred embodiment of the present invention, the generic device controller unit system focuses, more specifically, on the interaction between a processor and the peripheral devices that are being controlled. More particularly, this embodiment of the generic device controller unit system includes a general-purpose device controller that employs true real time peripheral device control. The device controller connects a non-true real time operating system with various non-specific peripheral devices and permits the non-true real time operating system to implement true real time control of the peripheral devices without a processor requiring a real time kernel or a layered true real time operating system.

In yet another preferred embodiment of the present invention, the generic device controller unit system provides a data and protocol communications interface to translate between the processor and the peripheral devices that are being controlled. More particularly, this embodiment of the generic device controller unit system includes a generic device data and protocol communications interface. The interface connects the processor and various peripheral devices, allowing the processor to utilize a single protocol and its associated data to communicate with the various peripheral devices, which may utilize different protocols and associated data than that used by the processor.

A preferred method of the present invention provides data and protocol interfacing and facilitates interaction between a processor and any number of peripheral devices. More particularly, the method includes connecting a non-true real time operating system and non-specific peripheral devices; employing true real time peripheral device control through a generic device controller unit; and providing a data and protocol communications interface between the processor and the peripheral devices, thereby allowing a processor to utilize a single data and protocol interface to communicate with multiple peripheral devices utilizing any number of different protocols and associated data streams. The device controller allows a non-true real time operating system to implement true real time control of peripheral devices without the non-true real time operating system requiring a real time kernel or a layered true real time operating system.

In another preferred embodiment, instructions that are universally recognized by the processor and the generic device controller unit are used to communicate between them. The instructions comprise a meta-message set that may be maintained in both the processor and the generic device controller unit. Updates to the meta-message set may be performed and broadcast from the processor to one or several generic device controller units in a network using one or more of instructions from the meta-message set.

Other features and advantages of the present invention will become apparent from the following detailed description, taken in conjunction with the accompanying drawings, which illustrate by way of example, the features of the present invention.

BRIEF DESCRIPTION OF THE DRAWINGS

FIG. 5A illustrates a logical data flow diagram from a "light bulb" application to an actual light bulb;

FIG. 5B illustrates a data flow diagram of the top logical transport layer of FIG. 5A, and the logical data flow from an application program interface to a GDCU packet decoder in a second logical transport layer, as well as physical data flow between the top and second layers.

DETAILED DESCRIPTION OF THE PREFERRED EMBODIMENTS

Figure 1:
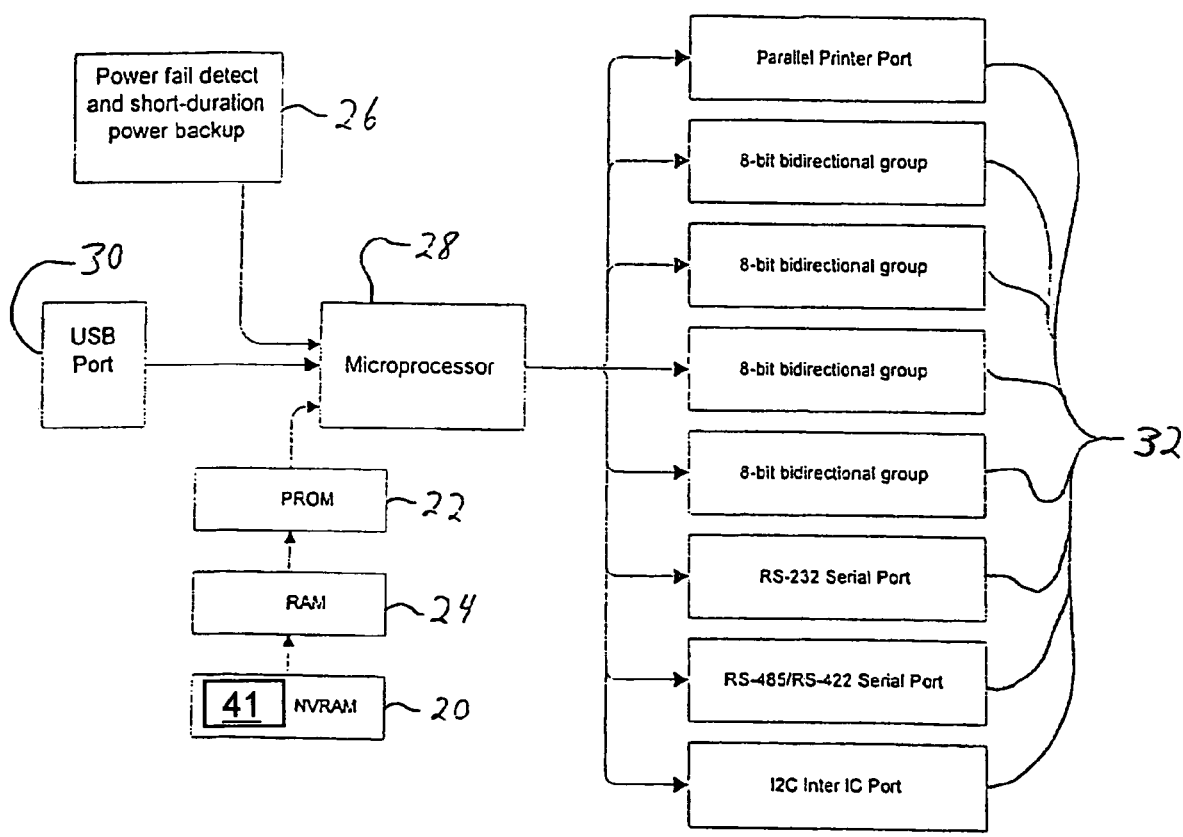
FIG. 1 illustrates a component diagram of the system architecture of a generic device controller unit system, in accordance with the present invention.

A preferred embodiment of a generic device controller unit system and methodology constructed, in accordance with the present invention, provides a data and protocol communications interface, which facilitates "true real time" interconnection between a processor and any of a variety of non-specific peripheral devices sought to be controlled. Referring now to the drawings, wherein like reference numerals denote like or corresponding parts throughout the drawings and, more particularly to FIGS. 1-2, there is shown one embodiment of a generic device controller unit system 10 constructed in accordance with the present invention.

Briefly stated, the generic device controller unit (GDCU) system 10 includes a generic "true real time" peripheral device controller and a data and protocol communications interface. The device controller unit system 10 is generic, in that the system 10 is capable of connecting a processor 40 to a number of various peripheral devices 50, instead of being designed to interconnect a processor to only a specific peripheral device. The generic device controller unit system 10 connects a processor 40 using a standard non-true real time operating system and peripheral devices 50 in such a manner as to employ true real time peripheral device control. The "true real time" device controller of the system 10 allows a standard non-true real time operating system to implement true real time control of the peripheral devices 50, instead of requiring a special "true real time" kernel or a special "true real time" layered operating system to be utilized with the processor 40. Moreover, the generic device controller unit system 10 interfaces between the processor 40 and the peripheral devices 50 such that the data and protocol communications interface of the system allows the processor to utilize a single type of protocol and associated data in order to communicate via the GDCU system with the peripheral devices which may be utilizing different types of protocol and associated data.

Described now in greater detail, and again referring to FIGS. 1-2, one preferred embodiment generic device controller unit system 10, constructed in accordance with the present invention, preferably provides a "true real time" device controller that produces true real time peripheral device control while interfaced with a processor 40 running standard non-true real time software. A preferred embodiment of the present invention provides a method of allowing any definition of true real time for any given application, from one millisecond to one nanosecond. In this manner, the system 10 is adaptable to the true real time requirements of any given application. Preferably, the device controller of the system 10 allows the processor 40 (preferably, but not necessarily functioning in a Win32 environment) to employ "true real time" peripheral device control. The generic device controller unit system 10 provides this real time device control to the resource management capabilities of the standard non-true real time operating system. Advantageously, the generic device controller unit system 10 produces true real time peripheral device control without the higher-level functionality of the processor 40. This higher processor level functionality, which has previously been required by specific device controller units, is extremely complex and expensive. The present invention consequently reduces such complexity and associated expense. Moreover, the present invention allows the use of commercially available, off-the-shelf, devices from the personal computer, consumer electronics, and industrial control businesses, in order to increase the speed of product development and innovation. This allows changes to be introduced both efficiently and rapidly.

Using the data and protocol communications interface of the system 10, the common interface components from all protocols and associated data are integrated into a single "universal" communications stream, which enables conversion from an existing data and protocol communications stream to any other type of data and protocol communications stream. By "universal," it is meant that the data and protocol communications interface of the GDCU system 10 accepts, for example, the USB protocol and associated data from a processor 40 and converts this protocol and data stream into any of $I^2C$, RS-232, RS-422/RS-485, parallel printer port, 8-bit bi-directional ports, general purpose digital I/O port interfaces, or any other desired protocol and associated data. Conversely, the data and protocol communications interface of the GDCU system 10 accepts these protocols and data streams, and converts them into the USB protocol and its associated data for use by the processor 40. The data and protocol communications interface of the GDCU system 10 provides such generic data and protocol interface for connecting the processor 40 with any desired process control device 50 to be controlled by the system. Thus, by using the GDCU system 10, in accordance with the present invention, any device 50, regardless of its chosen protocol and data, can associate with and interface with the processor 40.

More particularly, modern software applications and devices 50 are comprised of numerous internal electromechanical modules which all need to be controlled by and communicate with higher-level systems. The GDCU system 10 provides a controller with sufficient additional input/output capability to control any device. The GDCU system 10 contains custom designed system drivers that allow the GDCU system to be a simple controller which includes components that are common to many devices 50, with the device-specific higher intelligence functions carried out by the processor 40. The GDCU system 10 provides input/output functionality while using the host processor 40 as the higher-level intelligence in a conventional Windows operating system environment. The GDCU system 10 is easily modifiable due to its modularity, which allows one level to be changed without having to change other levels. For example, encryption and decryption can be added by changing the packet encode and decode layers without having to change the physical transport layers. Similarly, the protocols and associated data can also be simply changed.

As stated above, in a preferred embodiment of the present invention, multiple protocols and their associated data can be utilized by a single GDCU system 10. As such, a GDCU system 10 can communicate with multiple devices. The GDCU system 10 allows multiple protocols and functions to be combined into one system, while allowing the GDCU system 10 to always communicate with the processor 40 through a consistent interface. Thus, the processor and operating system are only required to use a single protocol with its associated data to communicate with the GDCU system 10 through the consistent interface. The GDCU system 10 incorporates a unique distributed processing configuration that allows for multiple tasks with arbitrary devices.

Specifically, a preferred embodiment generic device controller system 10 of the present invention connects to the processor 40 (sometimes referred to as a master control unit, or a MCU) with associated support hardware. The processor 40 can be any computer, but is preferably a general-purpose single board computer including an operating system, software, and associated elements. The single board computer is adapted to plug into an instrument for controlling a process. The preferred operating system is a Windows NT embedded system image configured to support a protocol, such as USB. Other acceptable operating systems for the processor 40 include, by way of example only, and not by way of limitation: Windows NT, Windows 98, Windows 2000, LINUX, WinCE, QNX, DOS, VXWorks, Whistler, and Whistler embedded.

Furthermore, a development station can be used by a developer in order to implement customized solutions on the GDCU system 10. Such a development station is built around the processor 40 and the generic device control unit system 10. The development station provides the hardware and software required to work with these two devices in order to design and realize a sophisticated embedded control system. The development station comes with a number of peripheral and plug-in items. These items include, by way of example only, and not by way of limitation: a floppy drive, IDE CD-ROM and hard drives, AGP video board, keyboard, mouse, PCI 10/100 Ethernet network interface card, and a representative assortment of 32-pin plug-in chips for the MCU board including, but not limited to SRAM, FLASH memory, and M-Systems DiskOnChip®.

In one preferred embodiment of the present invention, the generic device controller unit (GDCU) system 10 resolves the hardware interconnect problems that have been experienced in the past by using the industry standard universal serial bus (USB). The universal serial bus was designed by a consortium of major hardware and software manufacturers in order to solve a set of problems that were caused by characteristics and limitations of the "IBM compatible" computer architecture, as it collided with an ever-expanding user base of people without specialized technical skills. End users typically want to simply be able to plug in a new device and have it work properly without having to open their computers to install new hardware. The universal serial bus protocol standard was designed to address this need.

The universal serial bus was designed to centralize much of its complexity into the host so that individual devices could be simple and inexpensive. The bus specification allows for each device, as it is plugged in, to tell the USB host what type of device it is, and what device driver should be dynamically loaded so that the device can be used. For these and other reasons, USB is the preferred embodiment physical transport layer for the GDCU system 10. However, it will be appreciated by those skilled in the art that although some USB characteristics are very desirable for GDCU system 10 purposes, the use of the USB protocol standard is desirable, but not necessary. That is, any suitable protocol can be used. The basic generic device controller unit system 10 is independent of any particular physical bus. Accordingly, ATM, Ethernet, CAN, $I^2C$, or multi-drop serial communications could also be used with equal effectiveness in alternate preferred embodiments of a generic device controller unit system 10 in accordance with the present invention. Moreover, the system can be configured to drive any network protocol, including, by way of example only, and not by way of limitation: Ethernet, ATM, WAN, Infrared, Serial, and fiber optics.

In a preferred embodiment of the present invention, the GDCU system 10 is designed to assist engineers in taking advantage of the universal serial bus technology while saving time and money. Device drivers and USB communications protocols are provided so that an engineer can focus on developing control system applications. Preferably, the GDCU system 10 uses the USB communications protocol to talk to a host computer (e.g., the processor 40) and one or more of the following protocols (listed by way of example only, and not by way of limitation) for communicating with connected devices 50: RS-232 and RS-422/RS-485 serial ports, LPT parallel printer ports, and 32-bit (i.e., four 8-bit) bi-directional digital I/O. Custom designed device drivers and software libraries are also provided. Preferably, the data lines on the GDCU system 10 are configured for I/O using these drivers. Once the data lines are configured, data can be written and its status examined. The application is written with subroutine calls that direct the GDCU system 10 to turn particular bits on or off and then to examine the state of other bits.

In one preferred embodiment of the present invention, the processor 40 runs a Windows® application that translates information into commands for the GDCU system 10. The application uses drivers to communicate with the GDCU system 10 via the processor 40 USB port. In one preferred embodiment of the GDCU system 10 of the present invention, the data and protocol communications interface is the communications portion of the system 10, which "talks" to the application in the processor 40 and to the different peripheral devices 50. The data and protocol communications interface of the GDCU system 10 allows a "universal" protocol and associated data to be used when interfacing with various physical devices 50. The data and protocol communications interface of the GDCU system 10 allows multiple events having varying input signals to be interpreted by a single generic device controller unit system 10, which is used to control the various peripheral devices 50.

Specifically, FIG. 1 illustrates the system architecture of one preferred embodiment of the generic device controller unit system 10, in accordance with the present invention. In this embodiment, the GDCU system includes a serial EEPROM with non-volatile memory 20, a PROM memory 22, RAM external memory 24, power fail detection and short duration power backup circuitry 26, an on-board processor 28, a watchdog timer (not shown), software resources, a universal serial bus port 30, and numerous input/output capabilities 32. These numerous input/output capabilities 32, include by way of example only, and not by way of limitation: Inter Integrated Circuit ($I^2C$) circuitry, RS-232 serial interface circuitry, RS-422/RS-485 serial interface circuitry, 32 general purpose bi-directional I/O lines, and a parallel printer port (and might further include fiber optics, CAN, Ethernet, and ATM).

In the serial EEPROM 20, which provides non-volatile memory, some of the memory is reserved by the GDCU System 10 for its own use (e.g., to store the Device ID code and the serial number), while the remaining memory is available to the user. In one preferred embodiment of the present invention, there are at least 512 bytes of non-volatile serial EEPROM memory 20. One preferred the Dallas Semiconductor 32K-by-8NVRAM satisfies embodiment of the present invention, which requires at least 8K of RAM and NVRAM. This memory is powered by a replaceable ten-year lithium battery. Preferably, but not necessarily requiring, there is at least 64K PROM for code and permanent data tables. A 32-pin socket, wired to accept a 27C256 or larger EPROM or FLASH memory, offers 32 kilobytes of program and data table memory. Additionally, there is preferably at least 32K RAM for variables and volatile data storage.

The power fail detection circuitry 26 includes a large electrolytic capacitor which buffers the incoming unregulated 9V power source (which is isolated through a diode) and acts as a power fail detector. The source side of that diode is monitored by an interrupt circuit. The effective result of this configuration is that, in the event of a power failure, the onboard processor is alerted to the power loss several hundred milliseconds before the voltage on the capacitor drops to the point where processing fails. This is sufficient time to store at least 128 bytes of data in the serial EEPROM 20. Preferably, the short duration power backup circuitry provides at least enough back-up power for 200 milliseconds of normal operation subsequent to a power failure. This provides protection for "real time" data in the event of power problems.

Preferably, the on-board processor is an 8051 industry standard 8-bit processor. In one embodiment this microcontroller is a Philips P80C652. This component is essentially identical to the 8051, except that it incorporates $I^2C$ circuitry in addition to the standard UART. Nevertheless, any suitable processor may be used, in accordance with the present invention. Other suitable processors include industry standard 8-bit processors by Cypress and Microchip.

The watchdog timer resets the on-board processor when the internal program stops behaving properly and is incorporated to enhance overall reliability. The watchdog timer's operation is transparent to the user.

With respect to the software resources, most user applications can be implemented using the built-in features of the GDCU System 10, but some applications may require custom programming of the onboard GDCU System processor 28. In one preferred embodiment, the GDCU System 10 incorporates 64 Kb of PROM 22 memory space, as well as 32 Kb of external RAM 24, for maximum flexibility for custom applications. Custom code development can be accomplished in several different ways, including contracted customer code development to specific user specifications, and merging custom developer's code with original code at compilation time.

In one preferred embodiment, the USB port requirements are satisfied by the Philips PDIUSBD12, which is a USB interface with a parallel processor access port.

In another aspect of one preferred embodiment, the RS-232 and RS-422/RS-485 serial interface circuitry receivers are multiplexed to the same Received Data In signal input on the 8051 computer. Thus, only one of these serial ports can be used at any one time. The MAX202 interface chip is available from Maxim. It creates ±ten volts from the +5V supply in order to deal with RS-232 voltages. The MAX3080 is one of Maxim's parts that matches the industry-standard 75180 pinout for RS-422/485 interfacing. The selection of which of the two interfaces is connected to the 80C652's RXD serial input line is configurable by the processor.

In yet another aspect of one preferred embodiment, the $I^2C$ port is incorporated in the 80C652. Preferably, there is a four-pin header for interfacing with the $I^2C$ port.

Preferably, the 32 general-purpose bidirectional I/O lines are arranged in four groups of eight lines. All eight lines in each group are either inputs or outputs at any one time. By the use of four ALS646 latching transceivers and two 16V8 programmable Logic Devices to address them, 32 I/O signals are established. They can be configured by the processor as inputs or outputs in groups of eight. Thirteen of those I/O lines perform dual duty as the outputs to the parallel printer port. (The four input lines from the parallel printer port go directly to some otherwise-unused pins on the 80C652).

In another aspect of one preferred embodiment, the eight data lines of the Parallel Printer Port share one of the four general-purpose groups. Four additional output lines on a second general-purpose group are also used. Thus, when the parallel port is in use, two of the groups are dedicated to output, with twelve of the sixteen lines committed to the parallel port. Since the five parallel port input lines go directly to the processor chip, the other two general-purpose I/O groups remain uncommitted.

Referring now to the GDCU System 10 interconnects, all USB devices have a hexadecimal USB Vendor ID and Product ID. The USB specification also provides for a 16-bit Binary Coded Decimal (BCD) device ID, which can range from 0000 to 9999. The device ID is used to specify a particular GDCU board in a system where more than one is attached to the USB bus.

As discussed above, in one preferred embodiment of the present invention, the GDCU system 10 is a general-purpose eight-bit computer with a USB interface port. In short, it preferably has sufficient PROM and RAM memory to be generally useful for any reasonable interface to external equipment. It has the ability to detect that it is about to be shut down and store critical information in its on-board non-volatile serial EEPROM. For controlling and communicating with other devices it has thirty-two general-purpose I/O lines, an $I^2C$ two-wire interface port, an RS-232 serial port, and a parallel printer port, for a total of sixty-one active I/O signals. The hardware utilized in one preferred embodiment generic device controller unit system 10 of the present invention runs applications-specific firmware. The main task of the firmware is to provide proper signals for driving the output devices.

Furthermore, rather than produce unique firmware for every individual device to which the GDCU system 10 may be connected, a generalized protocol is used. This protocol has appropriate commands for configuring the GDCU system 10 (data directions, baud rates, driver enables, and the like) and for transmitting and receiving data. The firmware for the GDCU system 10 implements this protocol. Likewise, matching Windows or Macintosh device drivers are implemented for relatively low-level communications with the GDCU system 10 from the host computer side. In this fashion, the complicated intelligence needed to interface with any particular device can be kept in the application layers of the host computers that use the GDCU system 10 as a bridge.

Figure 2:
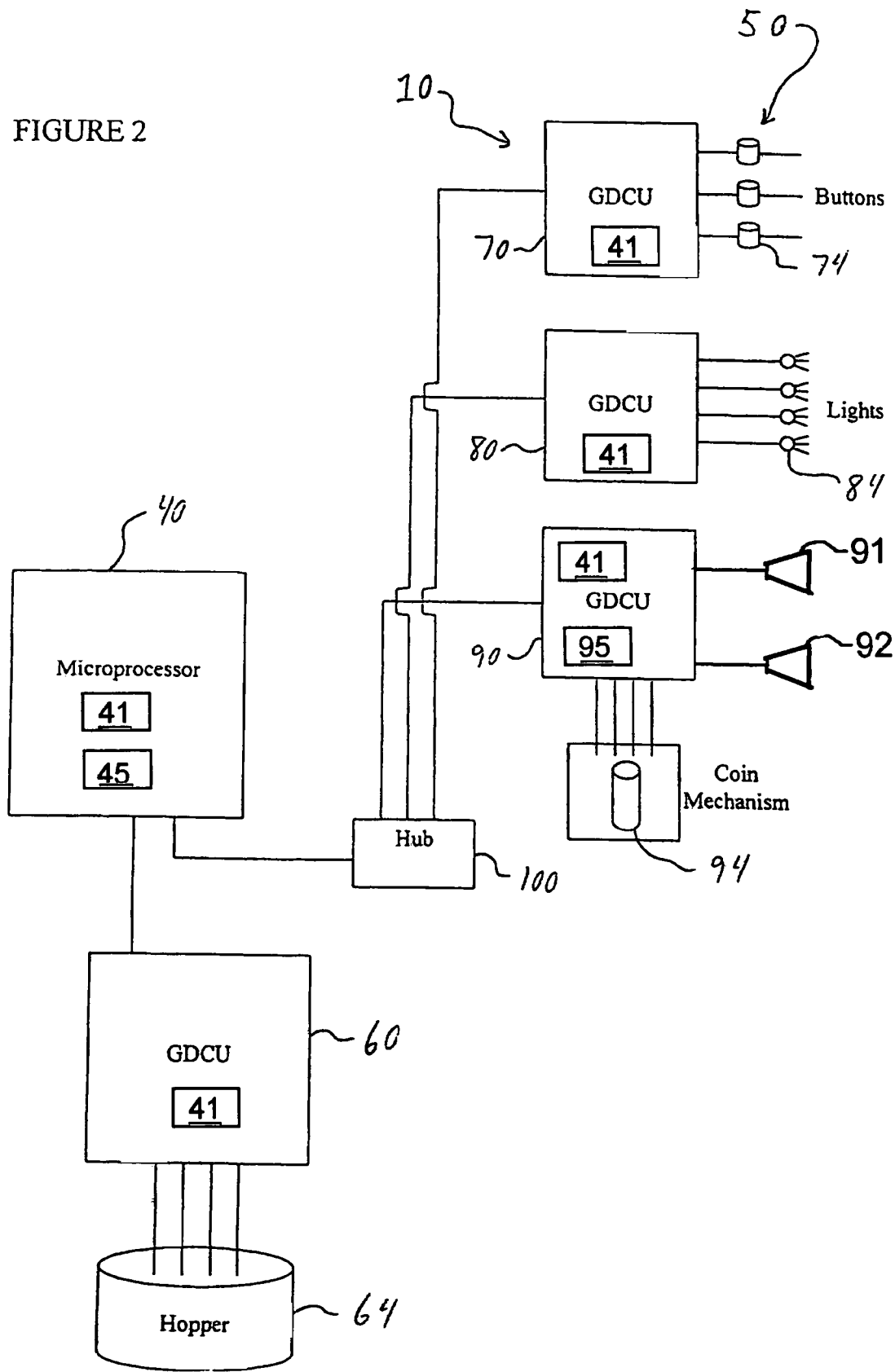
FIG. 2 illustrates an operational flow diagram of a generic device controller unit system of the present invention configured to interface with a processor and a single peripheral device.

Referring now to FIG. 2, a generic device controller unit system 10 is shown which is configured to connect a processor 40 for control of a single peripheral device 50 (the peripheral device having multiple tasks which require processor control). This embodiment of the system 10 of the present invention utilizes a less powerful processor (e.g., the 8051 processor) and is designed as an "al la carte" or "per device" type of generic device controller unit system 10. In this respect, this embodiment is a simpler, cheaper, and more flexible embodiment of the system 10 of the present invention. It allows for control of one peripheral device 50 without the need for expensive circuitry and functionality, which is not required for the task at hand.

Specifically, FIG. 2 shows a gaming assembly (by way of example only) that includes a processor 40 connected to a first GDCU system 60 and three additional GDCU systems 70, 80 and 90, connected to the processor 40 via a hub 100. The first GDCU system 60 interfaces with and controls a hopper device 64, while the three additional GDCU systems 70, 80 and 90, each control buttons 74, lights 84, and a coin mechanism 94, respectively. The buttons 74 and coin mechanism 94 are input devices that send information to the processor 40 for data communication and protocol translation via their respective GDCU systems 70 and 90, (through the hub 100). The processor 40 then processes the incoming data, and returns data as appropriate to the GDCU systems 60 and 80, which communicate and translate this data into commands that are sent to the output devices, specifically the hopper 64 and lights 84. This configuration allows additional devices to be easily added, removed, or swapped out since each device has its own generic device controller unit system.

Figure 3:
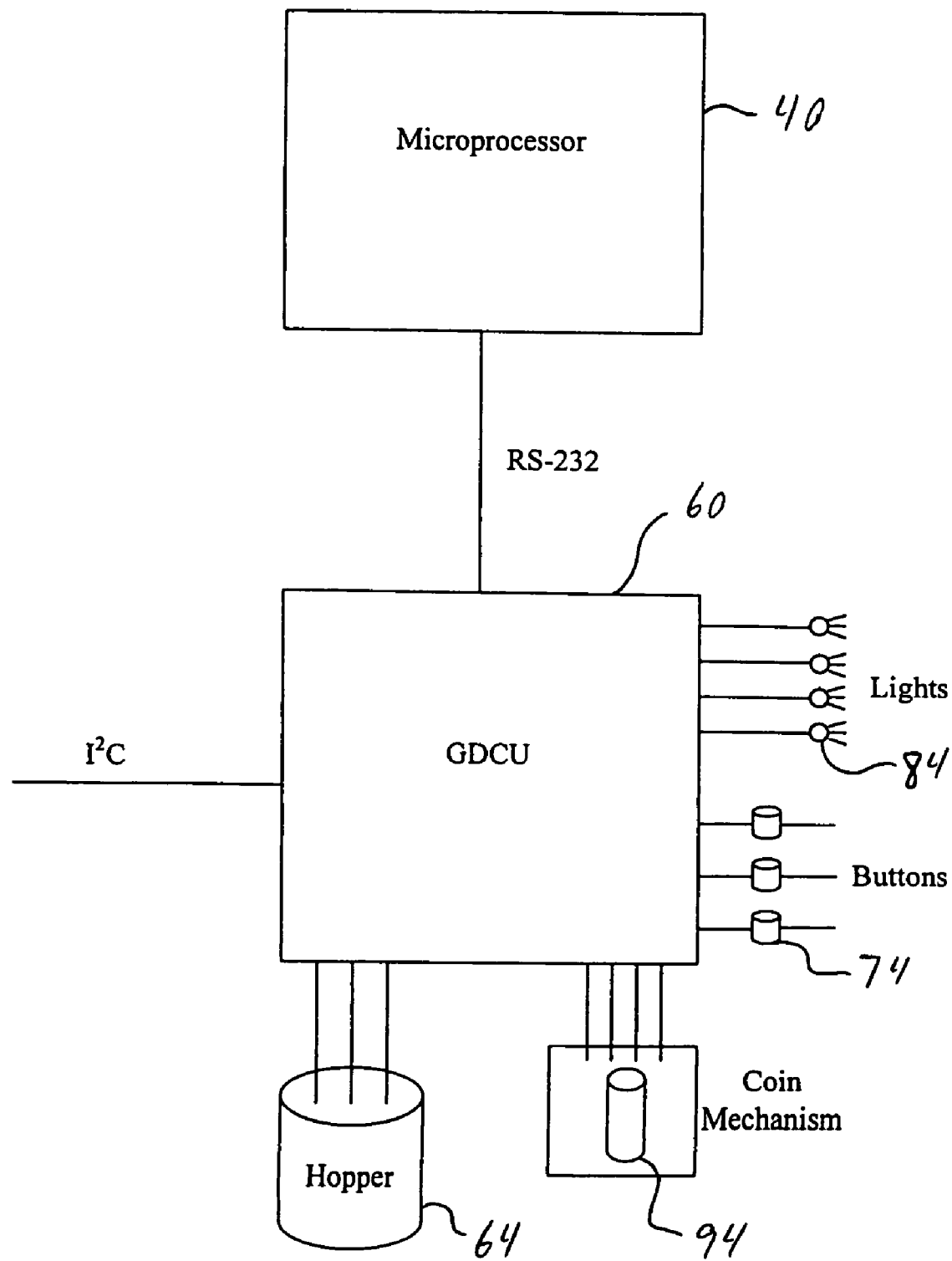
FIG. 3 illustrates an operational flow diagram of a generic device controller unit system of the present invention configured to interface with a processor and multiple peripheral devices.

Referring now to FIG. 3, a generic device controller unit system 60 is shown which is configured to connect to a single processor 40 for control of multiple peripheral devices 50. This embodiment of the system 60, in accordance with the present invention, utilizes a more powerful processor (e.g., a Motorola 68332 processor), and, as such, functions as a more powerful version of the generic device controller unit system 60. In this respect, this embodiment of the system 60 of the present invention is capable of handling a greater amount of input/output device requirements.

Specifically, FIG. 3 shows an assembly that includes a processor 40 connected to a single GDCU system 60. The single GDCU system 60 interfaces with and controls a hopper device 64, buttons 74, lights 84, and a coin mechanism 94, as well as having an I$^2$C port. In this embodiment, the buttons 74 and coin mechanism 94 are still input devices, which send information to the processor 40. However, in this case, both input devices utilize the single GDCU system 60 for data communication and protocol translation with the processor 40. Again, the processor 40 processes the incoming data using the non-true real time operating system, and returns data as appropriate to the GDCU system 60, which then communicates and translates this data into commands which are properly sent to the lights 84 and hopper 64 output devices using the true real time operating system of the GDCU system 10. This configuration allows a single generic device controller unit system 60 to control multiple devices, but still allows for additional devices to be added without requiring the removal and/or modification of the GDCU system 60, hopper device 64, buttons 74, lights 84, or coin mechanism 94.

Figure 4:
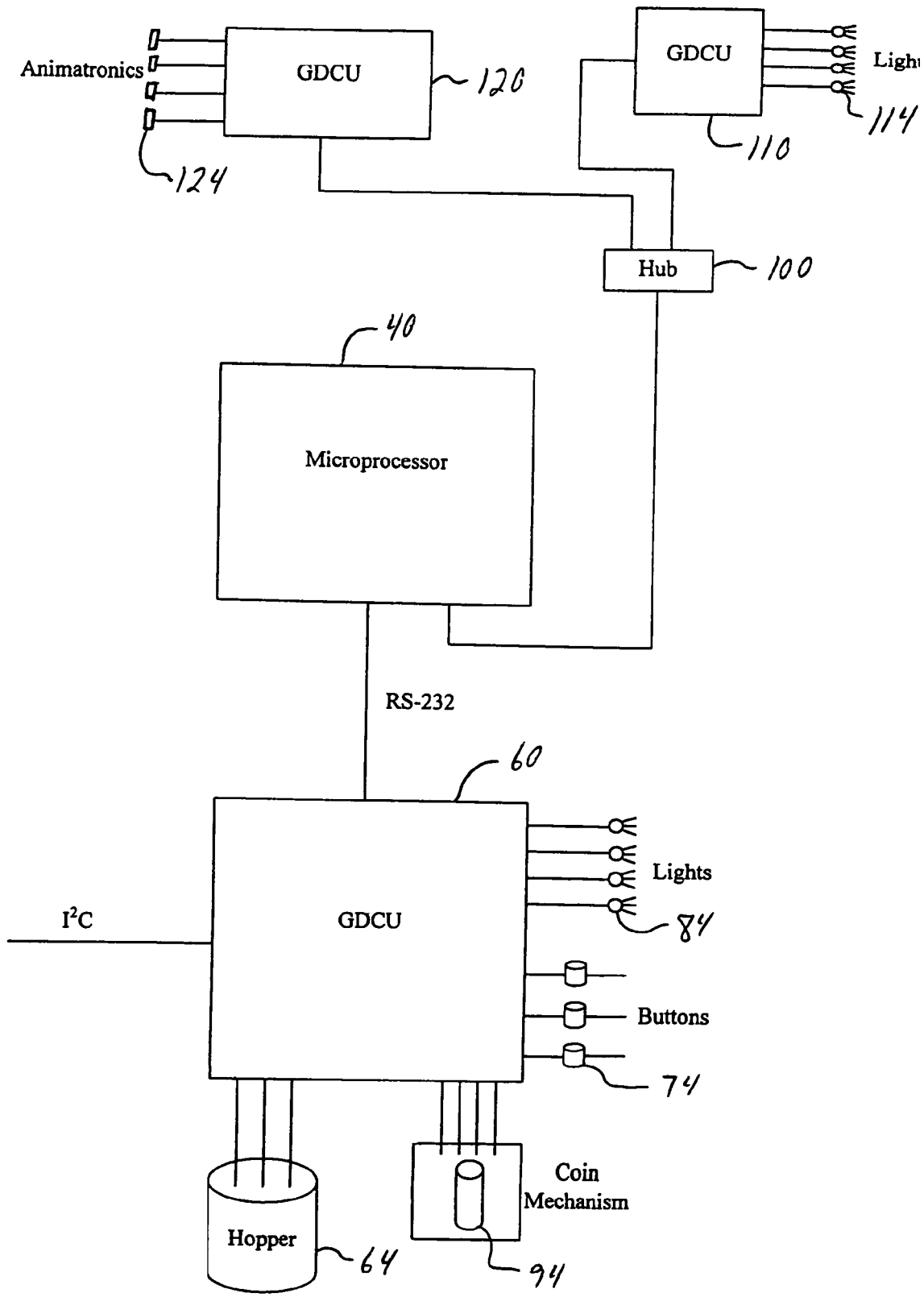
FIG. 4 illustrates an operational flow diagram of a hybrid system of the-present invention with one generic device controller unit system configured to interface with a processor and a single peripheral device, and a second generic device controller unit system configured to interface with the same processor and various other multiple peripheral devices.

Lastly, FIG. 4 illustrates a hybrid system 10 of the present invention with a processor 40 connecting to a plurality of generic device controller unit systems which are each configured to control a single peripheral device, as shown in FIG. 2, and another generic device controller unit system which is configured to control multiple peripheral devices, as shown in FIG. 3.

Specifically, FIG. 4 shows an assembly that includes a processor 40 connected to a first, more powerful GDCU system 60, and two additional less powerful GDCU systems 110 and 120, connected to the processor 40 via a hub 100. As in FIG. 3, the more powerful GDCU system 60 interfaces with and controls a hopper device 64, buttons 74, lights 84, and a coin mechanism 94, as well as having an I$^2$C port. Once again, in this embodiment, the buttons 74 and coin mechanism 94 are still input devices, which send information to the processor 40, and utilize the more powerful GDCU system 60 for data communication and protocol translation with the processor. The processor 40 processes the incoming data, and returns data, as appropriate, to the GDCU system 60, which then communicates and translates this data into commands that are properly sent to the lights 84 and hopper 64 (output devices). As can be seen from the FIGURES, this lower portion of FIG. 4 is the same as FIG. 3.

However, in this embodiment of the present invention, the processor 40 also returns data as appropriate to the GDCU systems 110 and 120 (via the hub 100), which then communicate and translate instructions from the processor 40 into commands, which are properly sent to the additional lights 114 and animatronics 124 (output devices). This configuration allows a single more powerful generic device controller unit system to control multiple devices; allows for additional devices to be added without requiring the removal an/or modification of the GDCU system 60, hopper device 64, buttons 74, lights 84, or coin mechanism 94; and allows for devices with their own generic device controller unit system (e.g. additional lights 114 and animatronics 124) to be easily added, removed, or swapped out since each device has its own generic device controller unit system.

Previously, for device controller unit systems which were device interface specific, conversion of an existing data and protocol interface to a different data and protocol interface (such as from I$^2$C to USB) would take substantial development time, effort; and expense, in developing the different code and circuitry required for each process control device. In contrast, the generic device controller unit system 10 of the present invention is configured to act as a device-generic, "universal" data and protocol interface.

In this regard, in accordance with the present invention, the GDCU system 10 can replace an embedded control system, a multi-tasking operating system, or any other prior art embedded application. The industry has various names for such an embedded control system. Such names, which include MPU (main or master processing unit), all relate to a single central embedded controller. A single central embedded controller is a complicated device that is capable of including the functionality of a GDCU system 10 and a processor 40 for a specific application. A single embedded control system is capable of controlling both peripheral devices 50 (which are controlled by the GDCU system 10), and application software (which is otherwise controlled by the processor 40). These types of single central embedded controllers are typically undesirable due to their lack of interchangeability and expense (due to having to meet both the GDCU system, processor, and real time operating system requirements). The GDCU system 10 can also eliminate the requirement of having an ISA plug-in card for each activity and the need for a real time layered operating system or expensive and "task specific" real time kernel.

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in the system 10, in firmware, in special purpose logic, analog circuitry, or any combination thereof without deviating from the spirit and scope of the present invention as recited within the claims attached hereto.

In other words, in a preferred embodiment generic device controller unit system 10 of the present invention, the use of an industry standard physical bus, with various elements supplied by different sources, allows a layered software interface concept to be utilized by the present invention.

Figure 5C:
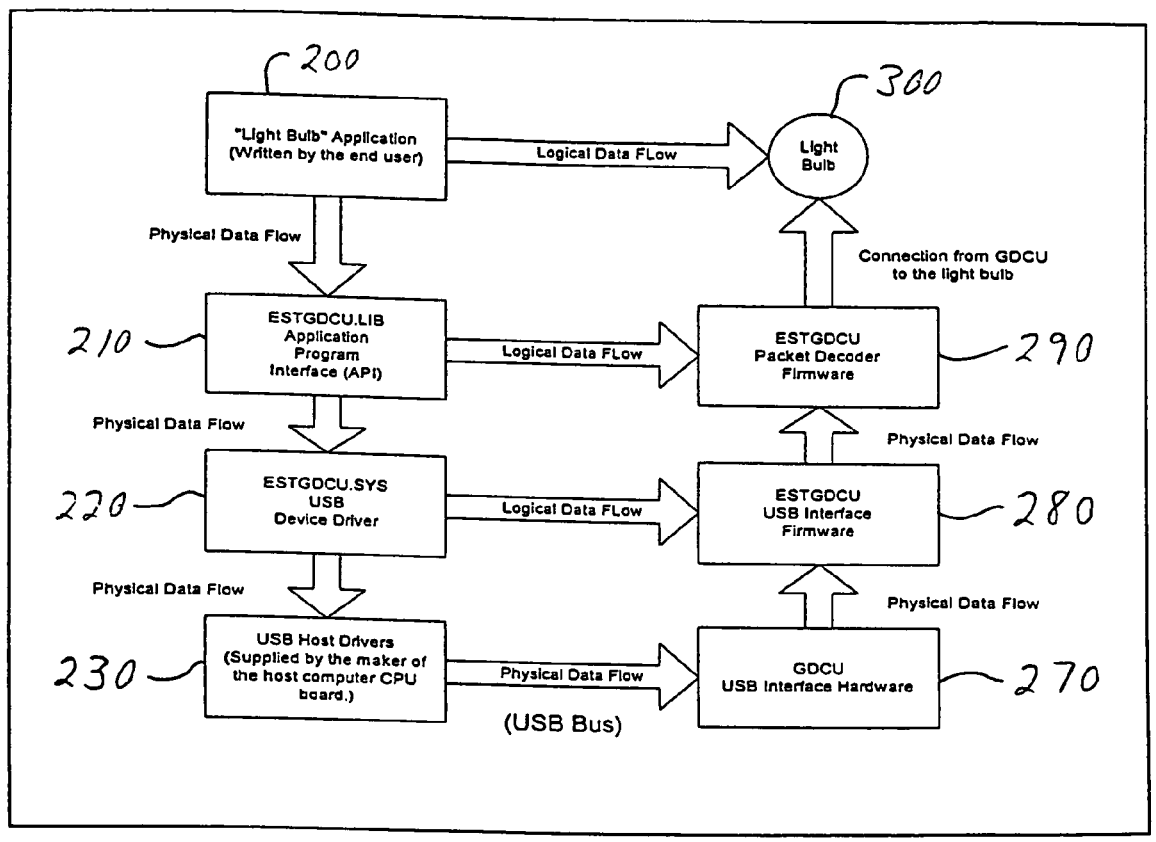
FIG. 5C illustrates a data flow diagram of the top logical transport layer of FIG. 5A, the second logical transport layer of FIG. 5B with physical data flow between the top and second layers, a logical data flow from USB device drivers to a GDCU USB interface firmware in a third logical transport layer, and a physical data flow from USB host drivers to GDCU USB interface hardware in the bottom physical transport layer, as well as physical data flow between layers.

Referring now to FIGS. 5A, 5B, and 5C to illustrate the above concept, consider the act of controlling a light bulb. In this case, a simple Windows application employs a single push button. As shown in FIG. 5A, according to this application, when the button is clicked with a mouse, a light bulb is illuminated. There is, of course, no physical connection between the Windows light bulb application 200 and the light bulb 300, but logically there is a connection. This very top layer of the communications and control structure is depicted as logical data flow from a light bulb application 200 to the actual light bulb 300.

Logically, this represents the desired implementation. The user's application wants to be able to turn the light bulb on and off without worrying about all of the system level requirements that are actually needed in order for this light bulb switching task to be implemented. However, a Window's application has no way of talking to a light bulb. As shown in FIG. 5B, what the application actually does is talk to an additional layer of software below it. The light bulb application 200 sends a physical data flow down to an application program interface (API) 210, which sends a logical data flow across to a packet decoder 290, which in turn is connected to the actual light bulb 300.

The light bulb software engineer has been told by the overall system designer that his light bulb is connected, for example, to Bit 3 on I/O Port 2 of the GDCU board, and that when the bit is set to High, the bulb will turn on. So when it is time to turn on the light bulb, all the "light bulb" application has to do is call the appropriate API library routine with the instruction "Set Bit 3 on I/O Port 2 to High."

The "light bulb" application 200 neither knows nor cares how the API routine 210 is going to arrange to turn on the bit. The application 200 does not know if the API routine 210 will perform the action itself, send a TCP/IP packet over the internet to a light bulb in Cleveland, or send e-mail to a janitor. The application just sends the request down and expects that the bulb will, indeed, turn on.

Likewise, the API routine 210 doesn't know why the "light bulb" application 200 wants the Bit set to High. What it does know how to do is encode the instruction "Set Bit 3 on I/O Port 2 to High" into a GDCU data packet that it then sends, in the logical sense, over to the matching GDCU data packet decoder 290 that resides in the firmware of the GDCU board. When the GDCU packet decoder 290 receives the packet, it pulls it apart and examines the packet. The packet decoder 290 learns that it is one of the packet types for controlling the digital I/O data bits on the GDCU board, and Sets Bit 3 on I/O Port 2 to High, which causes the light bulb to light.

Once again, this is a logical connection. As shown in FIG. 5C, the API packet encoder routine 210 in the host computer cannot talk directly to the packet decoder 290 in the GDCU firmware. In the actual physical data flow communications path, physical data flows down from the light bulb application 200 to the application program interface (API) 210, down from the API 210 to the USB device driver 220, down from the USB device driver 220 to the USB host drivers 230, from the USB host drivers 230 across to the GDCU USB interface hardware 270, from the GDCU USB interface hardware 270 up to the GDCU USB interface firmware 280, from the GDCU USB interface firmware 280 up to the GDCU packet decoder firmware 290, which is finally connected to the light bulb 300 itself. Thus, two additional levels have been added to the structure.

The bottom layer in the above-described actual communications path is the physical transport layer. In one preferred embodiment GDCU system 10 of the present invention, that is the hardware of the universal serial bus. The interfaces on both sides of the bottom layer are supplied by the manufacturers of the USB interface hardware. As mentioned previously, since USB is a more frequently and more widely used protocol, there are numerous chip sets for both host and device side interfaces which adhere to the published USB specifications for physical and electrical interconnections.

On the host side of the connection, there are two logical protocols that have been defined by the USB user's group for USB communications. One is the universal host control interface (UHCI), and the other is the open host control interface (OHCI). In either case, the manufacturer supplies a Windows device driver, which allows the next layer up to communicate with the hardware.

The generic device controller unit system 10 typically has much less computational power available than does the host, and the operating system requirements (if any) are much simpler. The various makers of such chip sets have simple interfaces that allow a calling routine to determine the status of the USB, send a block of data, receive a block of data, and the like.

Returning to the host side, the job of translating between the application level GDCU software routines and the bottom level hardware routines is implemented by the GDCU device driver. This routine is effectively part of the operating system. Operating with trusted kernel level privileges, it can take the GDCU packets from the layer above and send them down to the hardware to be transmitted to the device. Logically, those USB data blocks are transmitted horizontally to the USB interface level of the firmware of the GDCU system 10. The USB interface level has the job of talking to the hardware, accepting the packets, and passing them upwards to the packet decoder.

For simplicity, the communications path has been described (and shown in FIGS. 5A-5C) as a uni-directional flow. In actuality, however, the communications are bi-directional, with the communications path arrows flowing in both directions. The above-described layered structure, although seemingly complex, actually conveys a greater flexibility in design. Each layer can be replaced without affecting the layers below it or above it.

For example, it may be desired to encrypt the GDCU data packets in order to prevent their content from being ascertained on the bus, or to implement data compression to improve data transmission time. This would only require changing the GDCU application program interface level on the host side, and rewriting the packet decoder level on the device side. Everything else would stay the same.

As an additional example, the physical transport layer could be changed from USB to ATM. Thus, the bottom layer would have to change. On the host side, a different GDCU device driver would have to be supplied, because its interface with the bottom level would be different. However, everything else on the host side would remain the same. Correspondingly, on the device side, the GDCU USB interface firmware that interfaces with the communications hardware would have to be rewritten and changed, because the hardware would change. Again, however, its interface upward would remain the same.

From the point of view of the system designer and application developer, the functionality of the bottom three levels can be ignored. All they need to know is the capabilities of the GDCU system 10, and how to access them. As far as the application developer is concerned, the answer to those questions lies in the interface specifications of the GDCU application program interface software. The layered structure of the GDCU system 10 means that functionality can be changed or augmented by changing the GDCU API software on the host, and the packet decoder level on the device. Such functionality can be altered without paying attention to the transport levels below, and likewise the transport levels can be changed without requiring any alterations to the higher levels. This results in shorter development time and quicker time to market.

Referring now to the software resources, in one preferred embodiment to the present invention, a program is provided called GDCUCONFIG, which is used to change the Device ID on a GDCU board. Using GDCUCONFIG, the designer assigns a unique Device ID to each GDCU board. Then, when an application using the GDCU calls the various library routines to perform an I/O request, it specifies the Device ID for the target GDCU board.

With respect to the GDCU System 10 library software, in a preferred embodiment to the present invention, the following five files are used to compile and link the library software: ESTGDCU.H—Declarations and definitions; ESTGDCU.LIB—Multithreaded; ESTGDCUL.LIB—Multithreaded DLL; ESTGDCUD.LIB—Debug Multithreaded; and ESTGDCUDL.LIB—Debug Multithreaded DLL. The ESTGDCU.H must be included in the source file. The library selected depends on the choice of code generation.

The GDCU System 10 library routines are as shown generally in the following table:

TABLE 1

| ROUTINE | FUNCTION |
| --- | --- |
| GdcuSetPort Direction | Sets the direction of one of the four 8-bit ports |
| GdcuSetPortData | Sets the output data on one of the digital I/O ports |
| GdcuSetAllPortsData | Sets all four data ports in a single call |
| GdcuGetAllPortsData | Gets the data from the digital I/O ports |
| GdcuSelectRS232 | Sets the serial I/O to RS-232 and establishes the baud rate |
| GdcuSelectRS422 | Sets the serial I/O to RS-422/RS-485 and establishes the baud rate |
| GdcuSendSerialData | Puts a block of data into the serial output buffer |
| GdcuReceiveSerialData | Returns any received serial data |
| GdcuNvmRead | Reads data from the non-volatile serial EEPROM |
| GdcuNvmWrite | Writes data to the non-volatile serial EEPROM |
| GdcuGetFirmwareVersion | Returns the firmware version of the GDCU board |
| CountOurUsbDevices | Returns a count of GDCU boards and enumerates their symbolic handles (low-level routine) |
| GetGdcuSerialNumbers | Returns the serial numbers and status of all GDCU boards (low-level routine) |
| GdcuWrite | Transfers data from the host to the device (low-level host-to-device data transfer) |
| GdcuRead | Transfers data from the device to the host (low-level device-to-host data transfer) |

Table 1

The following section outlines the usage information for the GDCU System 10 library routines. In one preferred embodiment of the present invention, the GDCU System 10 routines include the following: CountOurUsbDevices, GdcuGetAllPortsData, GdcuGetFirmwareVersion, GdcuNvmRead, GdcuNvmWrite, GdcuRead, GdcuReceiveSerialData, GdcuSelectRS232, GdcuSelectRS422, GdcuSendSerialData, GdcuSetAllPortsData, GdcuSetPortData, GdcuSetPortDirection, GdcuWrite, and GetGdcuSerialNumbers.

The GDCU System 10 CountOurUsbDevices routine returns the number of GDCU boards currently attached to the system's USB bus. Each of those devices has a complicated device name, which is assigned by the system. Those names are filled into the ppDeviceNames array. This array should be cleared before the first time the CountOurUsbDevices routine is called. If any of the ppDeviceNames pointers are not NULL, this routine attempts to release them with the C++ delete operator. Subsequent calls to CountOurUsbDevices cause the enumeration to be performed again, thus freeing up the results from any previous calls. It is up to the user to free up the memory represented by those character strings after the final call to CountOurUsbDevices.

The CountOurUsbDevices routine is used internally by other library routines for keeping track of the GDCU boards attached to the system. However, it is not required for normal use. This routine, together with the GetGdcuSerialNumbers routine is provided as a convenience for enumerating all of the boards connected to the system.

In a preferred embodiment of the present invention, the GDCU System 10 GdcuGetAllPortsData routine retrieves the data from the digital I/O ports. After specifying the device ID of the target GDCU board (BDC value 0000 through 9999), the size of the pbyData array is initialized (which can be any value 1 through 5). The pbyData array is the array of BYTES to be filled by the routine.

GdcuGetFirmwareVersion routine retrieves the version level of the GDCU firmware. The GdcuNvmRead routine reads to the non-volatile serial EEPROM memory in blocks of sixteen bytes. The routine contains a pointer to the array of bytes to be filled and the available size of the array in bytes.

Further, the GdcuRead routine transfers data from the device to the host. This routine also includes a pointer to the buffer to be filled from the GDCU System 10, as well as arguments for the available size of the buffer and the number of bytes received. The GdcuRead routine is only used when custom code is created for the GDCU firmware. The GdcuRead routine should not be called unless there is information in the GDCU System 10 waiting to be transferred. If the GDCU System 10 receives a read request from the USB host when it does not have data to go out, it responds by sending back a single ASCII question mark character.

The GDCU System 10 library contains the GdcuReceiveSerialData routine, which returns any received serial data. This routine also includes a pointer to the array of bytes to be filled, as well as arguments directed towards the available size of the array and the number of bytes received in the array.

The GdcuSelectRS232 routine sets the serial I/O to RS-232 and includes an argument which determines the baud rate to be one of 300, 600, 1200, 2400, 4800, 9600, 19200, or 38400. Any other value causes the circuitry to default to 2400. Although the GDCU System 10 contains circuitry for both RS-232 and RS-422/RS-485 communications, only one of those can be enabled at one time. Calling this routine specifies subsequent RS-232 communications.

In a preferred embodiment of the present invention, the GDCU System 10 library also contains the GdcuSelectRS422 routine. This routine sets the serial I/O to RS-422/RS-485 and contains an argument directed towards determining the baud rate to be one of 300, 600, 1200, 2400, 4800, 9600, 19200, or 38400. Once again, any other value causes the circuitry to default to 2400. This routine also contains a bOutputOn argument, which is used to specify between the TRUE RS-422 mode (the default), and the FALSE RS-485 mode. As discussed above, although the board contains circuitry for both RS-232 and RS-422/RS-485 communications, only one of those can be enabled at one time. Calling this routine specifies subsequent RS-422/RS-485 communications. The difference between RS-422 and RS-485 communications is that the RS-422 is continuously enabled, while RS-485 output drivers are only enabled when the device is transmitting. One preferred embodiment of the present invention also contemplates this routine to contain arguments to support automatic switching of the driver to the ON state while transmitting.

The GDCU System 10 library also includes the GdcuSendSerialData routine, which puts a block of data into the serial output buffer. This routine contains a pointer to the array of bytes to be transmitted, as well as an argument directed towards the number of bytes to be transmitted. This routine does not return until all of the bytes in the buffer have been transmitted to the GDCU System 10.

Additionally, the GDCU system 10 library further includes the GdcuSetAllPortsData routine, which sets all four data ports in a single cell. This routine contains a pointer to four bytes of data to be latched into the four output ports. The pbyData argument must point to a valid array of at least four bytes to avoid possible memory exception errors.

Continuing, the GDCU System 10 library includes the GdcuSetPortData routine. This routine contains arguments which set the following values: GDCU_PORT_0: the port on connector J8; GDCU_PORT_1: the port on connector J9; GDCU_PORT_2: the port on connector J10; and GDCU_PORT_3: the port on connector J11. This routine also contains an argument specifying eight bits of data to be latched into the port. It should be noted that data can be latched into a port even when it is set to GDCU_PORT_NWARD. When the port direction is subsequently switched to GDCU_PORT_OUTWARD, the previously latched data appears on that port at that time.

The GDCU System 10 library also contains the GdcuSetPortDirection routine, which sets the direction of one of the four 8-bit ports. This routine contains some of the same arguments as in the GdcuSetPortData routine relating to setting the values of the GDCU ports 0-3 to the ports on connectors J8-J11, respectively. The GdcuSetPortDirection routine further contains arguments directed towards the following values. GDCU_PORT_INWARD: read the port; and GDCU_PORT_OUTWARD: drive the port.

Further, the GDCU System 10 library also contains the GdcuWrite routine, which transfers data from the host to the device. This routine contains a pointer to the buffer to be sent to the GDCU, as well as arguments relating to the number of bytes to be sent to the buffer (buffer size), and the number of bytes finally sent (bytes transferred). The GdcuWrite routine is only used when customer code is created for GDCU firmware.

Finally, the GDCU System 10 library also includes the GetGdcuSerialNumbers routine. This routine contains several pointers, the first of which is a pointer to an array of 127 character pointers containing the system-defined names for the GDCU boards on the bus. This array is filled using the CountOurUsbDevices routine. The GetGdcuSerialNumbers routine also contains a point to an array for 127 BOOL variables. On return, this array contains TRUE for each valid DeviceName (FALSE means something is wrong with the board. Either some other routine has a handle to it open at this time, or there has been a surprise disconnect during the last few seconds, and the system has not yet decided that it no longer exists.). The routine also contains a pointer to an array of 127 WORD variables. Each WORD variable gets filled in with the Device ID for each valid GDCU board currently attached to the USB bus. Finally, the GetGdcuSerialNumbers routine also contains a pointer to an array of 127 DWORD variables. Each one of these DWORD variables gets filled in with the binary serial number of each valid GDCU board currently attached to the USB bus. The GetGdcuSerialNumbers routine is used internally by other library routines for keeping track of the GDCU boards attached to the system. It is not required for normal. This routine, together with the CountOurUsbDevices routine is provided as a convenience for enumerating all of the boards connected to the system.

In summary, a preferred embodiment generic device controller unit system includes a generic "true real time" peripheral device controller and a data and protocol communications interface. The system is generic, such that the system is capable of connecting a processor to any number of various peripheral devices, instead of being designed to interconnect a processor only to a specific peripheral device. The system interfaces between a standard non-true real time operating system and peripheral devices in such a manner as to employ true real time peripheral device control, while allowing for bandwidth sharing, data speed differences, and accommodating for various levels of interrupt priority. The device controller of the system allows a standard non-true real time operating system to implement true real time control of peripheral devices. The system interfaces between a processor and peripheral devices such that the data and protocol communications interface of the system allows the processor to utilize a single protocol and associated data in order to communicate with peripheral devices, which are utilizing different protocols and associated data.

In a preferred embodiment of the present invention, device connection is not limited to a few number of corn ports, since the hardware interface of the system allows a large number of devices to be "daisy-chained" together. The present invention eliminates the need to rely on corn ports, which are slow (typically 9600 baud) and, further, which do not address the need to mix high-speed data (video) and low speed data (mouse clicks) communications, as does a preferred embodiment of the present invention. Moreover, a preferred embodiment of the present invention allows the use of commercially available, off-the-shelf, devices from the personal computer, consumer electronics, and industrial control businesses, which increases the speed of product development and innovation. In addition, the present invention eliminates the need for developers to have to perform undesirable Windows device driver development work. Finally, the GDCU system 10 of the present invention is adaptable to the true real time requirements of each particular application, therefore, allowing virtually any definition of true real time for use in any given application, (e.g. from one millisecond to one nanosecond).

Referring back to FIG. 1,. as previously described, each GDCU system may 10 use a generalized protocol for uniform transmission and reception of data. In one embodiment, the generalized protocol is extended to comprise a meta-message set for providing actual instructions to the GDCU system 10. The meta-message set (shown as 41 in FIG. 1) and microcode instructions (not shown in FIG. 1) corresponding individually to each GDCU system 10, may be stored in the EEPROM 20, or burned into the PROM memory 22.

The generalized protocol may be used to set data directions, baud rates, driver enables, and the like, as described above. With reference back to FIG. 2, the meta-message 41 set, and micro code implementation (shown as 95 in GDCU system 90) to interpret the messages in the meta-message set 41, are stored in the EEPROM (not shown in FIG. 3) of each GDCU system 60, 70, 80, 90, as are the API library routines to implement the micro-code instructions to the various hardware elements controlled by each GDCU system 60, 70, 80, 90. The meta-message set 41 may include universal instructions that can be recognized by all GDCU systems 60, 70, 80, 90 corresponding to each of the tasks that each GDCU system 60, 70, 80, 90 is to perform. The routines stated in Table 1 above may be just a few of those included in the Meta-Message set 41, each of which may use appropriate arguments.

With reference back to FIG. 5C, and using the light bulb example, when a meta-message set is used that is recognizable by all GDCU systems 60, 70, 80, 90, low level instructions such as "Set Bit 3 on I/O Port 2 to High" no longer need to be stored in the API library ESTGDCU.LIB. Instead, the API routine 210 only needs to provide a general meta-message set instruction, such as GdcuLightBulb, across the USB interface. The GDCU system 60, 70, 80, 90 itself is able to recognize the GdcuLightBulb instruction once it arrives from the USB interface. The decoder firmware 290, which may include the microcode of the GDCU system 60, 70, 80, 90 has its own API library, and interprets the generalized instruction GdcuLightbulb, and provides the resulting, low-level instruction "Set Bit 3 on I/O Port 2 to High" to cause the light bulb 300 to light. Thus, each GDCU 60, 70, 80, 90 is able to interpret any Meta-Message set instruction that it may receive from the GDCU USB interface, or other network being used, and is able to perform the low level operations according to the instruction.

Thus, the meta-message set allows the low level operations to remain in the microcode of each specific GDCU system 60, 70, 80, and 90. In the light bulb example, in this embodiment, only the GDCU system 60, 70, 80, 90 to which the light bulb is attached actually issues the command to "Set Bit 3 on I/O Port 2 to High" from its own microcode as a result of the general instructions from the meta-message set.

It can readily be seen from the simple light bulb example that the meta-message set has a wide variety of uses. Expanding on the light bulb example, a widely variable set of messages may be provided for signaling needs, especially in a gaming machine network environment. The universal ability for GDCU systems 60, 70, 80, 90 to communicate using a common message set 41 allows the GDCU systems 60, 70, 80, 90 to more easily communicate across networks. Messages may be included in the Meta-Message to satisfy signaling needs for progressive games, lotteries, and the like, rather than using a series of disparate message sets to communicate with specific GDCU systems.

As stated above, in accordance with one embodiment, a Universal Serial Bus (USB) is the preferred communication protocol between GDCU systems 60, 70, 80, 90 and gaming processors. Further, in another embodiment, whether using USB, Ethernet, RS232 or other network typologies, GDCU systems, gaming processors, and servers may transmit messages from the meta-message set between each other using XML protocol. This reduces the burden on software programmers, centralizing the message reception and generation logic, and providing for a scalable, modular and cohesive code, which provides higher quality software and faster time to market.

With reference back to FIG. 2, the use of the meta-message set 41 for the GDCU systems 60, 70, 80, 90, processors 40, and servers (not shown) to communicate with each other also provides modularity, in that GDCU systems 60, 70, 80, 90 and other components may easily be swapped in and out of a gaming system or network. The modular and cohesive codes provided by the meta-message set 41 may be implemented in software or hardware in the GDCU systems 60, 70, 80, 90, processors, and servers, or combinations of hardware and software. Using a GDCU network that implements the meta-message set 41 in hardware or software, when a new or additional protocol is required, a GDCU system 60, 70, 80, 90 may be added to implement the protocol. For example, a GDCU system 90 may already exist to implement the protocol for operating a game machine stereo speaker system to replace a mono speaker. For illustration, one GDCU system 90 may already operate a speaker 91. However; it may be desirable to add another speaker 92, such that the two speakers 91 and 92 may operate in stereo. A gaming application running on a gaming processor 40, or remotely over a network from a server (not shown), may have its microcode 45 (or code in the case of a gaming server) modified to provide two audio signals instead of one, which would be one for each of the left and right speakers 91 and 92. However, although the hardware or software microcode 95 of the GDCU system 90 may be replaced to convert speaker operations from mono to stereo, the same message or subset of messages from the meta-message set 41 is used to provide the signals to the speakers 91 and 92.

For example, an instruction from the meta-message set 41 called GdcuSendSpeaker may have previously been used to transport and provide signals from the processor 40 to the GDCU system 41 configured for mono speaker operations in order to provide the mono speaker signal to the existing speaker 91. The GDCU system 90 configured for mono speaker operations may have, in turn, provided the proper electrical signals to the speaker 91 under the control of its internal microcode 95. When the new stereo speaker 92 is attached to the GDCU system 92, the microcode 95 of the GDCU system 90 is re-engineered to provide two channels of signals to the speakers 91 and 92 for the stereo sound. Similarly, the processor 40 sending the signals to the GDCU system 90 with the stereo speakers 91 and 92 attached may be re-written to provide stereo instead of mono sound signals. However, the same Meta-Message command GdcuSendSpeaker may be used by the processor 40 for sending the signal to the GDCU system 90 with the stereo speakers 91 and 92 attached.

Another instruction that may be a part of the meta-message set 41 is the GdcuUpdateMessageSet instruction. An argument to this instruction would be an update to the meta-message set 41. When the meta-message set 41 needs to be updated for new functionality, or to fix errors, the GdcuUpdateMessageSet instruction is broadcast to all components that use the meta-message set 41. When each component receives the GdcuUpdateMessageSet instruction, the relevant microcode is called to update the component's local version of the meta-message set 41. In the case of a GDCU system 60, 70, 80, 90, the microcode is able to write to the EEPROM or re-burn the PROM, depending on where the meta-message set 41 is stored, to update the meta-message set 41.

While the generic device controller unit system of the present invention has been described with respect to gaming systems and gaming-assemblies, it will be appreciated by those of ordinary skill in the art that the generic device controller unit system and methodology can be readily applied in various other non-gaming technological areas. These other non-gaming technical areas include, by way of example only, and not by way of limitation: manufacturing, amusement parks, control systems, security systems, and mechanical assembly production lines.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A generic device controller unit system comprising:
a plurality of gaming machines networked in a gaming machine network environment, each of the plurality of gaming machines comprising a non-true real time computer and at least one general purpose device controller, wherein:
  (a) the non-true real time computer comprises (i) a gaming processor,(ii) a non-true real time operating system, (iii) data representing a set of instructions of a meta-message set for communicating with the at least one general-purpose device controller, the meta-message set including a meta-message for updating one or more of the instructions in the meta-message set, and (iv) data representing a micro code implementation to interpret the messages in the meta-message set in the computer, and
  (b) the at least one general purpose device controller employs asynchronous true real time peripheral device control, wherein the device controller (i) interfaces between a plurality of peripheral devices and the gaming processor, thereby allowing the non-true real time operating system to implement true real time control of the plurality of peripheral devices; and (ii) implements
a data and protocol communications interface, wherein the communications interface connects the gaming processor and the plurality of peripheral devices, thereby allowing the gaming processor to utilize a single protocol and associated data to communicate with the plurality of peripheral devices which may be utilizing protocols and associated data which are different than that used by the gaming processor;
wherein the at least one general purpose device controller further comprises:
  (a) data representing a set of instructions from a meta-message set for communicating with the computer, the meta-message set including the meta-message for updating one or more of the instructions in the meta-message set, and
  (b) data representing a micro code implementation to interpret the messages in the meta-message set in the general purpose device controller and responsive to the meta-message for updating one or more of the instructions in the meta-message set by updating the data representing the set of instructions from the meta-message set and updating the data representing the micro code to include data to interpret the updated one or more instructions in the meta-message set.

2. The system of claim 1, wherein the generic device controller unit system further includes customized system drivers responsive to the instructions from the meta-message set.

3. The system of claim 1, wherein the generic device controller unit system provides real time device control to resource management capabilities of a standard non-true real time operating system responsive to the instructions from the meta-message set.

4. The generic device controller unit system of claim 1 wherein the general purpose device controller further comprises API library routines to implement the micro-code instructions.

5. A meta-message set system for facilitating interaction between electronic components, the meta-message set system comprising:
one or more meta-message instructions that are universal to each of the components; and
at least one of the components comprising a general purpose device controller employing true real time asynchronous peripheral device control, wherein the device controller interfaces between a plurality of peripheral devices and one of a plurality of gaming machines networked in a gaming machine network environment, each of the gaming machines having a non-true real time computer having a gaming processor, and a non-true real time operating system, thereby allowing the non-true real time operating system to implement true real time control of the plurality of peripheral devices;
wherein the one of the plurality of gaming machines further comprises:
  (a) data representing a set of instructions of the meta-message set for communicating with the at least one general-purpose device controller, the meta-message set including a meta-message for updating one or more of the instructions in the meta-message set, and
  (b) data representing a micro code implementation to interpret the messages in the meta-message set in the computer; and
wherein the at least one general purpose device controller further comprises:
  (a) data representing a set of instructions from a meta-message set for communicating with the computer, the meta-message set including a meta-message for updating one or more of the instructions in the meta-message set, and
  (b) data representing a micro code implementation to interpret the messages in the meta-message set in the general purpose device controller and responsive to the meta-message for updating one or more of the instructions in the meta-message set by updating the data representing the set of instructions from the meta-message set and updating the data representing the micro code to include data to interpret the undated one or more instructions in the meta-message set.

6. The system of claim 5, wherein a database of instructions from the meta-message set is stored in two or more of the components.

7. The meta-message set system of claim 5, wherein the general purpose device controller further comprises API library routines to implement the micro-code instructions.

8. A method for facilitating interaction between electronic components, comprising:
establishing a meta-message set containing one or more meta-message instructions universal to each of the components, the meta-message set including a meta-message for updating one or more of the instructions in the meta-message set; and
controlling a plurality of peripheral devices by sending one or more of the meta-message instructions from the meta-message set to at least one of the components, the at least one component comprising a general purpose device controller employing true real time asynchronous peripheral device control, wherein the device controller interfaces between the plurality of peripheral devices and a gaming processor in a gaming machine having a non-true real time computer and a non-true real time operating system, the plurality of gaming machines being networked in a gaming machine network environment, thereby allowing the non-true real time operating system to implement true real time control of the plurality of peripheral devices;

wherein the computer further comprises:
- (a) data representing the set of instructions of the meta-message set for communicating with the general-purpose device controller, and
- (b) data representing a micro code implementation to interpret the messages in the meta-message set in the computer; and wherein the general purpose device controller further comprises:
- (a) data representing the set of instructions of the meta-message set for communicating with the computer, and
- (b) data representing a micro code implementation to interpret the messages in the meta-message set in the general purpose device controller and responsive to the meta-message for updating one or more of the instructions in the meta-message set by updating the data representing the set of instructions of the meta-message set and updating the data representing the micro code to include data to interpret the undated one or more instructions in the meta-message set.

9. The method of claim 8, further comprising storing a database of instructions from the meta-message set in two or more of the components.

10. The method of claim 9, comprising sending an instruction to update the database of instructions from the meta-message set to each of the two or more components.

11. The method for facilitating interaction between electronic components of claim 8, wherein the general purpose device controller further comprises API library routines to implement the micro-code instructions.

* * * * *

UNITED STATES PATENT AND TRADEMARK OFFICE
CERTIFICATE OF CORRECTION

| | | |
|---|---|---|
| PATENT NO. | : 7,721,006 B2 | Page 1 of 1 |
| APPLICATION NO. | : 10/956431 | |
| DATED | : May 18, 2010 | |
| INVENTOR(S) | : James Morrow | |

It is certified that error appears in the above-identified patent and that said Letters Patent is hereby corrected as shown below:

Column 2
Line 42, replace the word "corn" with --COM--.

Column 15
Line 46, delete "Table 1".

Column 18
Line 41, remove the number "10".

Column 20
Line 64, delete the "." after the word "will".

Signed and Sealed this

Thirty-first Day of August, 2010

David J. Kappos
*Director of the United States Patent and Trademark Office*